Aug. 20, 1963   H. E. CROSSLEY, JR   3,101,031
ELECTRO-HYDRAULIC ACTUATOR SYSTEM
Original Filed Dec. 22, 1955   6 Sheets-Sheet 1

Inventor
Harry E. Crossley Jr.
by
Mason, Kolehmainen, Rathburn and Wyss
Attorneys.

Aug. 20, 1963  H. E. CROSSLEY, JR  3,101,031
ELECTRO-HYDRAULIC ACTUATOR SYSTEM
Original Filed Dec. 22, 1955  6 Sheets-Sheet 2

Inventor
Harry E. Crossley Jr.
by
Mason, Kolehmainen, Rathburn and Wyss
Attorneys.

Inventor
Harry E. Crossley Jr.
by
Mason, Kolehmainen, Rathburn and Wyss
Attorneys.

Aug. 20, 1963  H. E. CROSSLEY, JR  3,101,031
ELECTRO-HYDRAULIC ACTUATOR SYSTEM
Original Filed Dec. 22, 1955  6 Sheets-Sheet 5
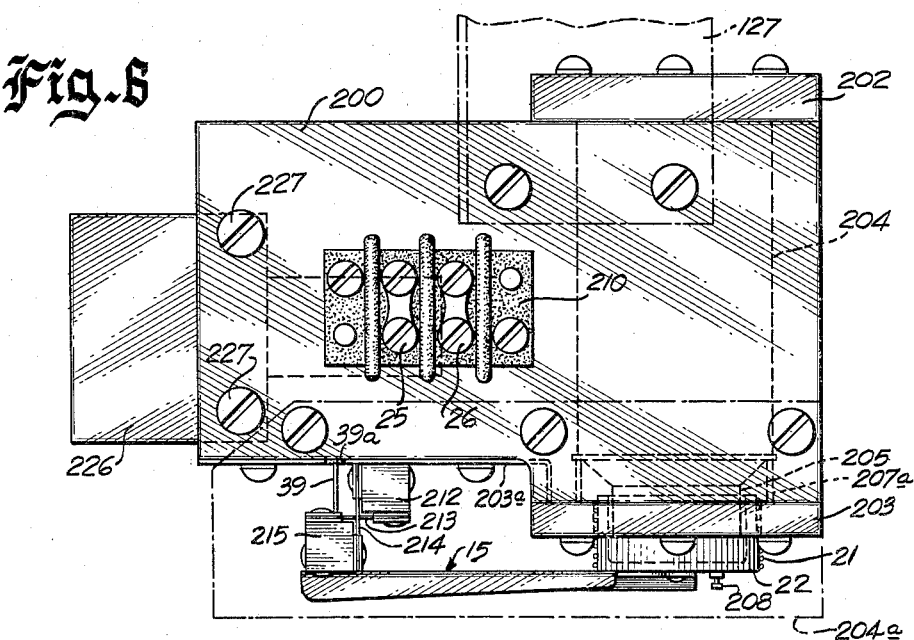
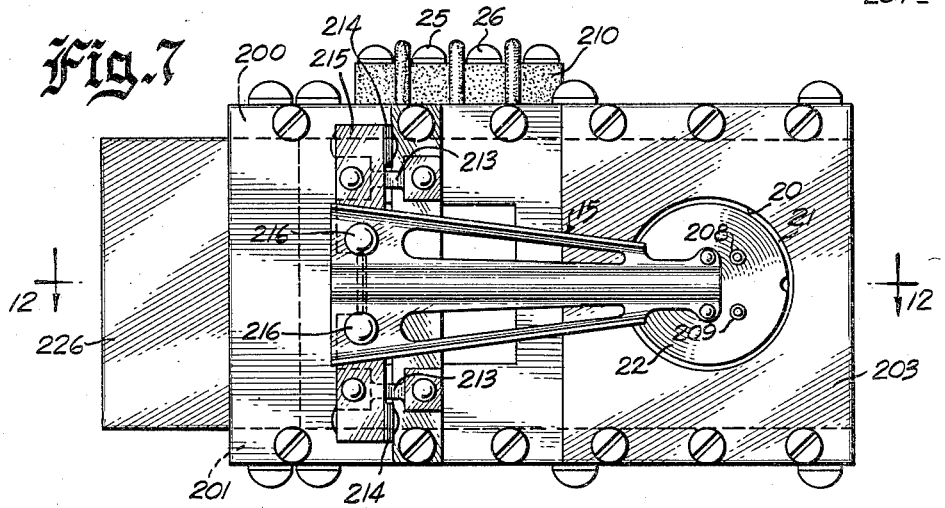
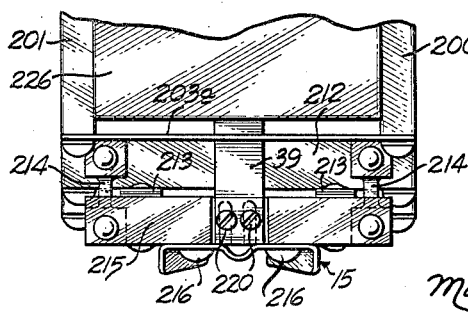
Inventor
Harry E. Crossley Jr.
by
Mason, Kolehmainen, Rathburn and Wyss
Attorneys

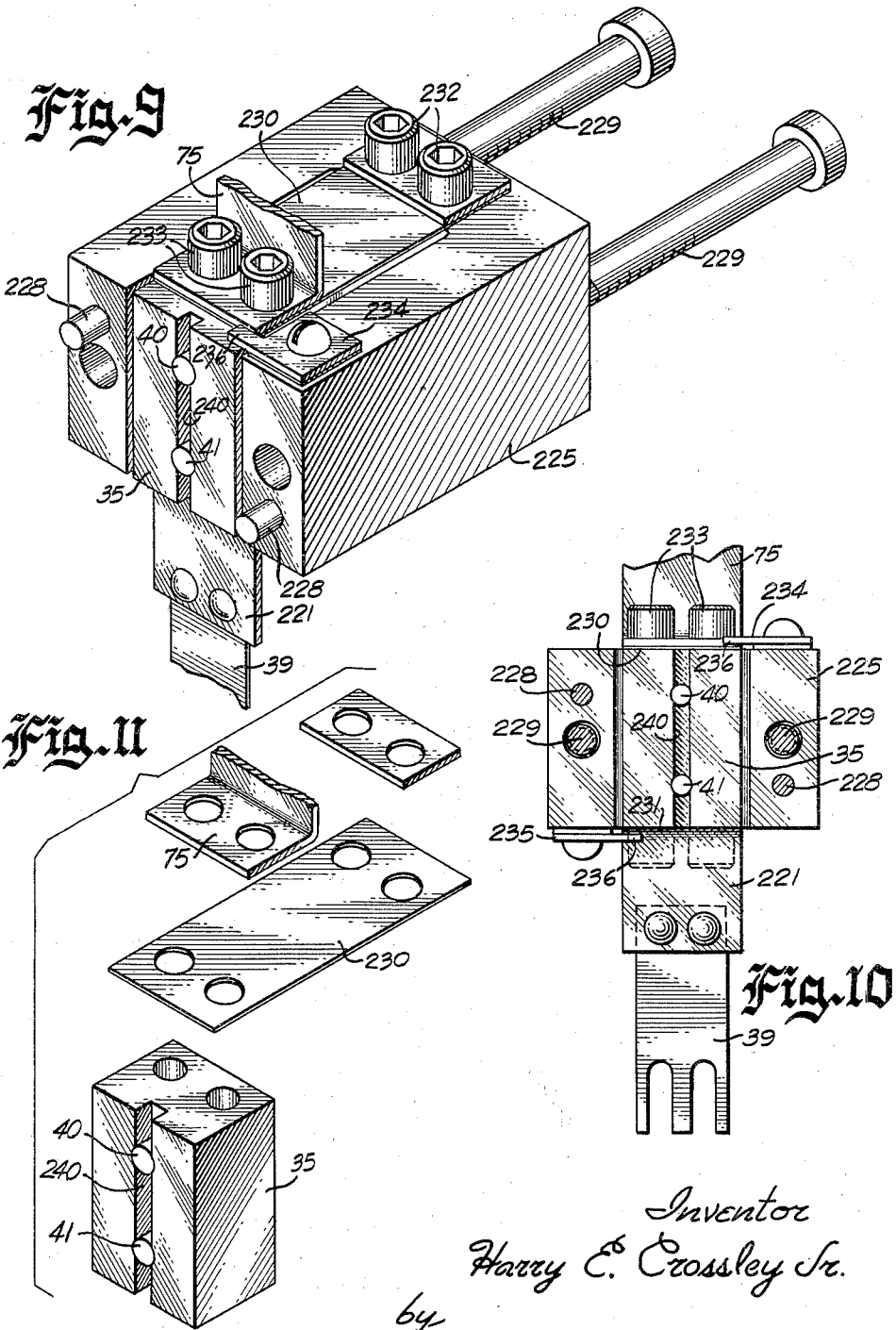

United States Patent Office 3,101,031
Patented Aug. 20, 1963

3,101,031
ELECTRO-HYDRAULIC ACTUATOR SYSTEM
Harry E. Crossley, Jr., Topsfield, Mass., assignor to Robertshaw-Fulton Controls Company, Richmond, Va., a corporation of Delaware
Continuation of application Ser. No. 554,896, Dec. 22, 1955. This application Sept. 8, 1960, Ser. No. 56,628
11 Claims. (Cl. 91—364)

This application is a continuation of applicant's prior copending application Serial No. 554,896, filed December 22, 1955, now abandoned.

The present invention relates to an electro-hydraulic valve actuator system which is particularly suitable for use in conjunction with or as a substitute for an electronic process control system of the type disclosed in U.S. Patent No. 2,949,273, issued August 16, 1960.

The above identified patent discloses an automatic process control system wherein a direct current signal is transmitted from the process area to the control area, this direct current signal being converted into an error voltage from a predetermined set point and modified to provide proportional reset and rate action for a desired mode of control. The modified error voltage is then reconverted to a corresponding direct current signal which is transmitted back to the process area and is applied to an electro-pneumatic valve positioning unit which is employed to control the main process control valve. While such an arrangement is satisfactory for its intended purpose, it does require a pneumatic supply, which must be suitably filtered, dried, etc., and a connection to the plant air supply as well as the electrical connections required for the electro-pneumatic positioning unit. Furthermore, such a pneumatic valve positioner is inherently slow acting and is relatively insensitive to changes in the electrical input signal.

It would be desirable to provide an electro-hydraulic valve actuator unit which would function from the standard direct current input signal of the process control system but which would be completely self-contained so as to eliminate supply lines and the like. Also, in situations where a relatively simple control operation is required, it would be extremely desirable to provide a self-contained electro-hydraulic valve actuator unit which can provide basic process control functions such as set point, proportional response, reset action, etc., so that the connections to the control area can be eliminated and a standard direct current signal from the transmitter, or measuring element, can be applied directly to this valve actuator unit.

It is, therefore, an object of the present invention to provide a new and improved electro-hydraulic valve actuator system.

It is another object of the present invention to provide a new and improved electro-hydraulic valve actuator unit which is adapted to function with a standard direct current input signal.

It is a further object of the present invention to provide a new and improved electro-hydraulic valve actuator unit which is self-contained and is adapted for function with a standard direct current input signal.

It is a still further object of the present invention to provide a new and improved electro-hydraulic valve actuator unit which is adapted to function with a standard direct current input signal and wherein a process set point is established so as to permit automatic control in a simple and economical manner.

It is another object of the present invention to provide a new and improved electro-hydraulic valve actuator unit which is adapted to function with an electrical input signal and wherein proportional response is obtained within the valve actuator unit itself.

It is still another object of the present invention to provide a new and improved electro-hydraulic valve actuator unit which is adapted to function with an electrical input signal and wherein reset rate response is obtained within the valve actuator unit itself.

The invention, both as to its organization and method of operation, together with further objects and advantages thereof, will best be understood by reference to the following specification taken in connection with the accompanying drawings, in which:

FIG. 6 is a front elevational view of the electro-magnetic balance and control valve portion of the unit of FIG. 2;

FIG. 7 is a bottom view of the electro-magnetic balance and control valve unit of FIG. 6;

FIG. 8 is a left side view of the unit of FIG. 6;

FIG. 9 is a perspective view of the control valve portion of the unit of FIG. 6;

FIG. 10 is a left end view of the control valve of FIG. 9;

FIG. 11 is an exploded view of the movable valve element assembly of FIG. 9;

Figure 1:
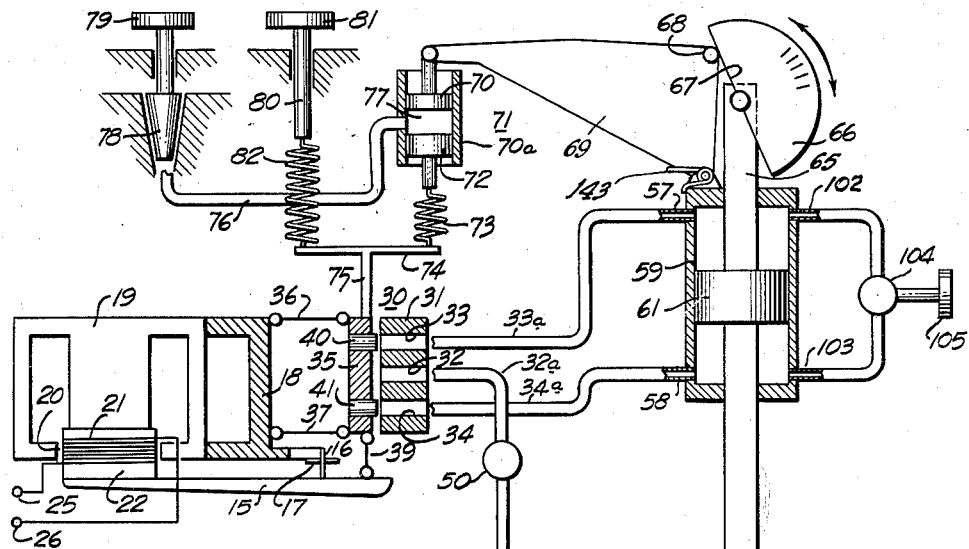
FIG. 1 is a diagram showing the electro-hydraulic valve actuator system of the present invention in somewhat diagrammatic form.
Figure 2:
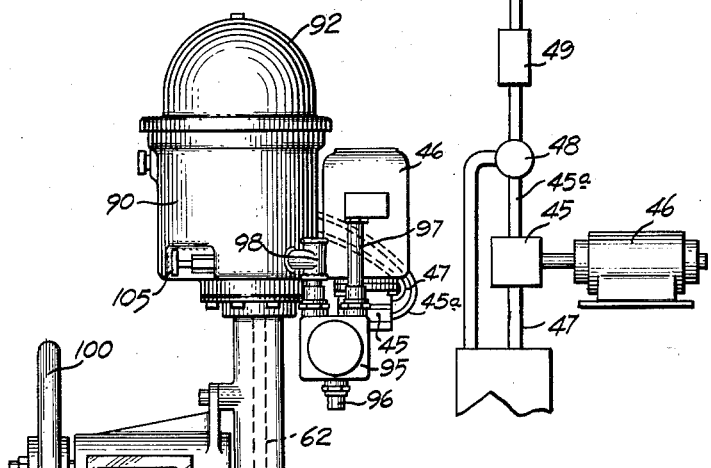
FIG. 2 is a side elevational view of the complete electro-hydraulic valve actuator unit of the present invention shown in conjunction with a main control valve.

Referring now to the drawings and more particularly to FIGS. 1 and 2 thereof, the electro-hydraulic valve actuator unit of the present invention is therein illustrated in somewhat diagrammatic form as comprising a beam 15 which is pivotally supported by means of the crossed flexure elements 16 and 17 on a base member 18, the base member 18 being secured to a permanent magnet structure 19 which defines an annular air gap 20. A coil 21 is wound on a nylon coil form 22 which is supported by the beam 15 and is positioned within the air gap 20 of the magnetic structure 19. A standard direct current signal of from 0.5 to 5.0 milliamperes is impressed upon the input terminals 25 and 26 and when this current flows through the coil 21, a corresponding force is exerted on the beam 15. A sensitive control valve, indicated generally at 30, is provided to convert movement of the beam 15 into a corresponding hydraulic pressure. The valve 30 is provided with a fixed manifold member 31 which has a central inlet port 32 therein and a pair of outlet ports 33 and 34. The movable valve element 35, which is supported from the base member 18 by means of the flexure members 36 and 37, is connected to the beam 15 by means of the linkage 39 and is provided with the plug members 40 and 41 which are adapted to register with the outlet ports 33 and 34 when the valve element 35 is in the neutral position, as will be described in more detail hereinafter. A pump 45, which is driven by the fractional horsepower electric motor 46, supplies hydraulic fluid from the inlet line 47 at a pressure of from 250 to 500 p.s.i. through the conduit 45a to a relief valve 48, a filter 49, and a check valve 50 and to the inlet port 32 of the control valve 30.

In order to control the main or final control valve 60 (FIG. 2) of the process, there is provided a cylinder 59 within which is positioned a piston 61 which is connected to the valve stem 62 of the main control valve 60. The cylinder 59 is provided with an upper inlet 57 and a lower inlet 58, the outlet ports 33 and 34 of the valve 30 being respectively connected to the inlets 57 and 58. The upper end of the piston rod 65 supports a proportional band indexing plate 66 which is provided with the linear cam surface 67, the angle of which may be varied by adjusting the position of the plate 66 with respect to the piston rod 65. A cam follower 68 is provided on one end of the lever arm 69 and is biased into engagement with the cam surface 67, the other end of the lever 69 being connected to one piston 70 of a dashpot arrangement indicated generally at 71. A piston 72 is also mounted within the cylinder 70a of the dashpot 71 and is connected through the coil spring 73 to one end of a crossbar 74 which is in turn connected to the upper end of the movable valve element 35 through the member 75. A bleed conduit 76 is connected from the dashpot chamber 77 to a needle valve 78, the position of which may be adjusted by varying the control knob 79. A set point adjustment member 80, which may be controlled by means of the knob 81, is connected through the coil spring 82 to the other end of the crossbar 74.

In order to provide a unitary electro-hydraulic valve actuator unit which has a self-contained hydraulic system while at the same time providing within the actuator unit itself the basic adjustments necessary to obtain normal process control functions, the electro-hydraulic valve actuator unit shown in FIG. 1 is positioned within a housing 90 (FIG. 2) which is adapted to be mounted directly on the yoke 91 of the main control valve 60 of the process. The housing 90 is provided with a sealed cover member 92 and a reservoir of hydraulic fluid is provided within the sealed housing formed by the members 90 and 92, the elements of the electro-hydraulic valve actuator unit being immersed in this fluid reservoir. The motor 46 is mounted on the side of the housing 90 and a junction box 95 is provided to which is connected the input cable 96 which includes a pair of 110 volt power conductors which are supplied through the conduit 97 of the motor 46 and a pair of control wires which are supplied through the conduit 98 to the input terminals 25 and 26 of the valve actuator unit shown in FIG. 1. The pump 45 is connected to this fluid reservoir through the line 47 and supplies fluid under pressure through the line 45a to the relief valve 48 within the housing 90.

In order to permit manual movement of the main control valve 60 by means of the conventional hand wheel 100, which is connected to the valve stem 62 through the bell crank 101, the cylinder 59 is provided with the bleed outlets 102 and 103 which are connected to a bypass valve 104 which may be opened by means of the control member 105 which is accessible from the exterior of the housing 90. The bypass valve 104 empties into the reservoir within the housing 90 as does the outlet from the needle valve 78, as will be described in more detail hereinafter.

Figure 3:
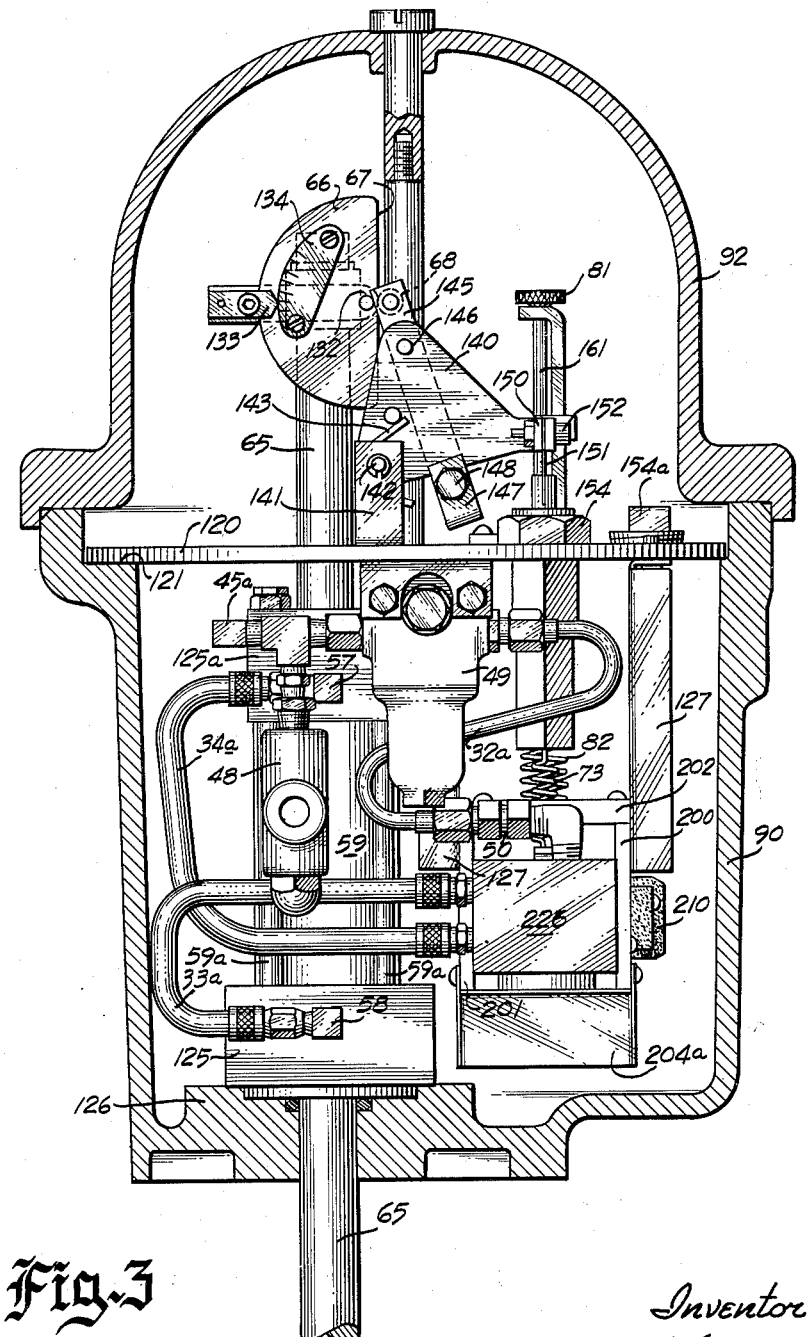
FIG. 3 is a sectional front elevational view of the unit of FIG. 2 taken along the center line thereof.
Figure 4:
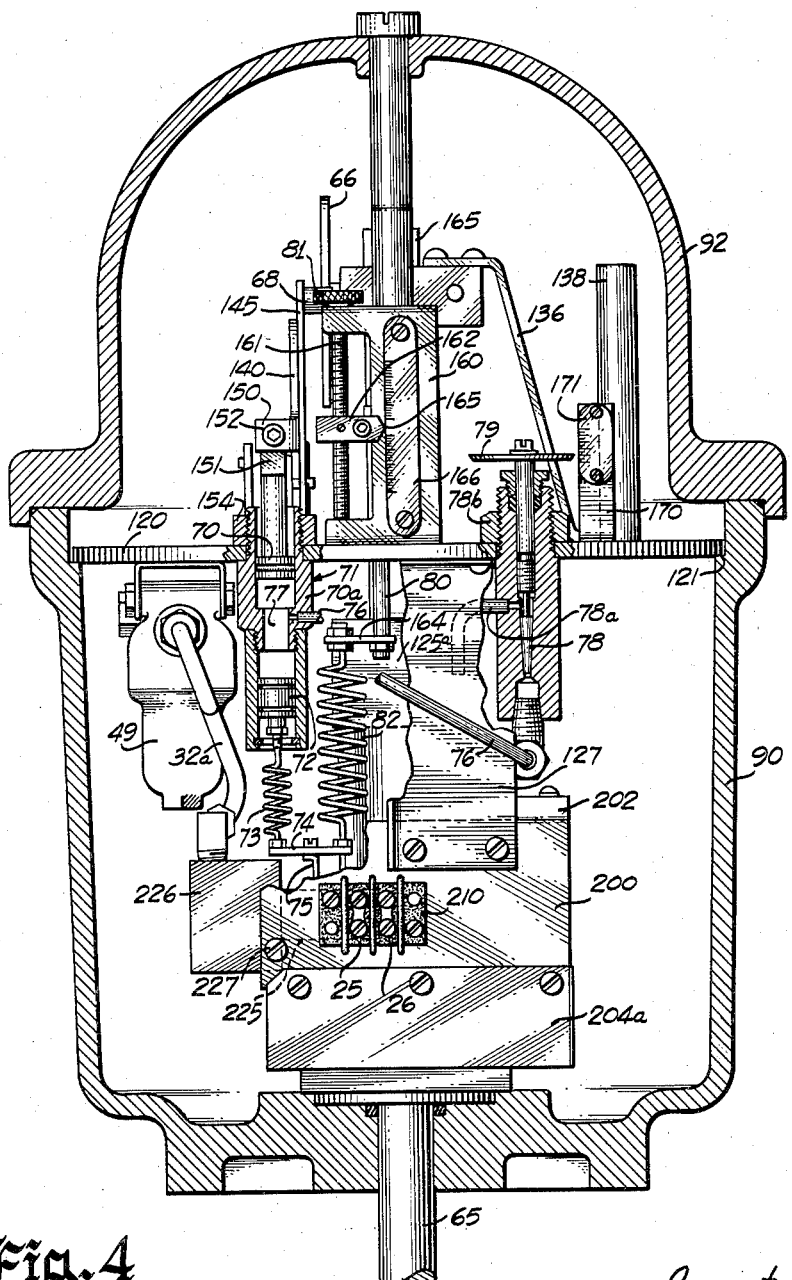
FIG. 4 is a sectional right side view of the unit of FIG. 2 taken along the central axis thereof.
Figure 5:
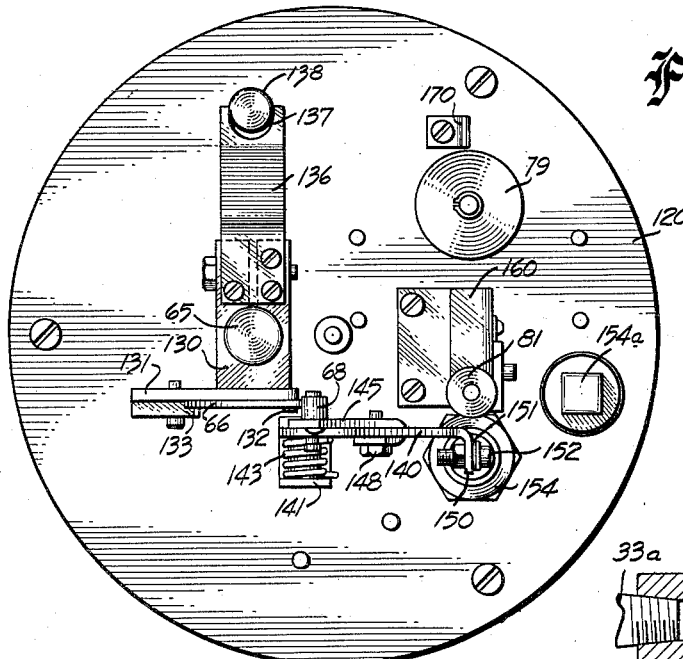
FIG. 5 is a top plan view of the unit of FIG. 2 with the cover thereof removed.
Figure 13:
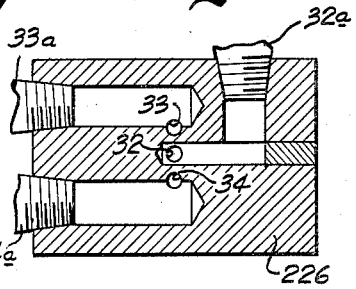
FIG. 13 is a sectional view taken along the line 13—13 of FIG. 12.
Figure 12:
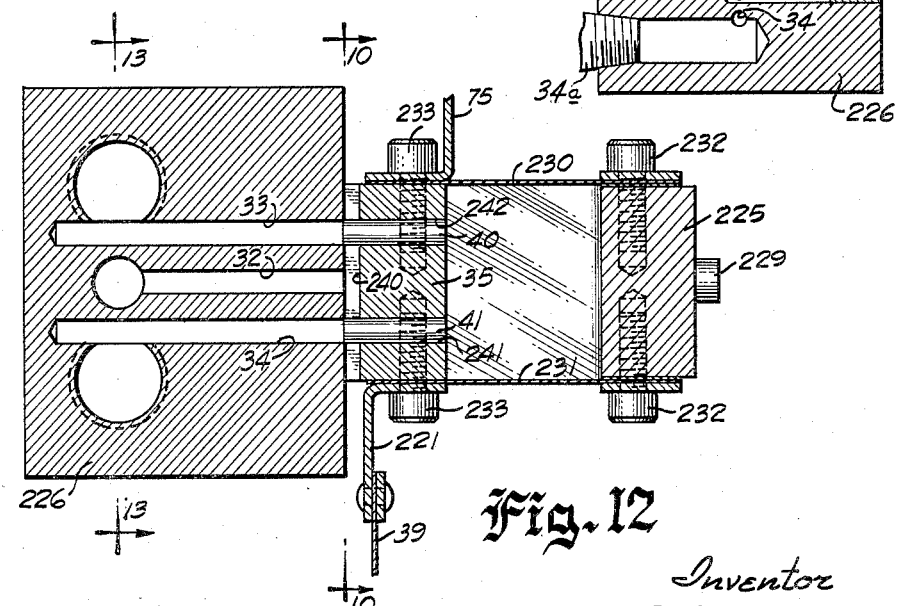
FIG. 12 is a sectional view taken along the line 12—12 of FIG. 7.

Referring now to FIGS. 3, 4, and 5, there is shown in these figures the physical arrangement of the elements of the electro-hydraulic valve actuator system of FIG. 1 within the housing 90 and the cover member 92. A mounting plate 120 is provided which rests on the rim 121 provided adjacent the open end of the housing 90 and the mounting plate 120 supports all of the elements of the electro-hydraulic valve actuator unit so that these elements may be withdrawn for service and repair by merely lifting the mounting plate 120 out of the housing 90, the conduits 32a and 34a being of sufficient length to permit this operation. The cylinder 59 is provided with a base member 125 which receives the conduit 58 and is supported on the boss 126 formed in the bottom of the housing 90, the bottom end of the piston rod 65 being connected to the valve stem 62 (FIG. 1) when the unit is installed on the main control valve. The cylinder assembly also includes an upper member 125a which receives the conduit 57, the cylinder assembly being held together by means of four tie rods 59a which extend between the upper and lower member 125a and 125. The electro-magnetic balance unit and control valve are mounted as a unit from the brackets 127 which are supported on the underside of the mounting plate 120. In a similar manner, the filter 49 is mounted on the bracket 128 and supports the relief valve 48 therefrom.

In order to provide an arrangement wherein no external linkage is employed, a double ended piston structure is used and a mounting bracket 130 (FIG. 5) is clamped to the upper end of the piston rod 65 and is provided with an end plate 131 to which the proportional band indexing plate 66 is pivotally mounted at 132. A pointer member 133 is secured to the end plate 131 and indicates the proportional band setting of the plate 66 on a scale 134 which is secured to the indexing plate 66. The bracket 130 also supports the upper end of an alignment member 136, the bottom end portion of which is provided with a U-shaped slot 137 which rides along an alignment post 138 which is mounted on the mounting plate 120. The lever 69 of FIG. 1 comprises a plate 140 (FIG. 3) which is pivotally mounted on the block 141 by means of the pin 142, the coil spring 143 being employed to bias the cam follower 68 into engagement with the cam surface 67 of the plate 66.

In order to adjust the range of feedback motion derived from the piston 65, the cam follower 68 is mounted on the end of a lever 145 which is pivotally secured to the plate 140 at 146 and is provided with a U-shaped bottom end portion 147 which may be clamped to the edge of the plate 140 by means of the bolt 148 so that the lever 145 may be held in the desired position. The plate 140 is provided with a right angle end portion 150 (FIG. 5) which is clamped to the upper end of a flexible member 151 by means of the bolt 152, the member 151 being connected to the upper piston 70 of the dashpot assembly 71. The upper cylinder portion 70a of the dashpot assembly 71 is secured to the mounting plate 120 by means of the nut 154. A bracket 160, which is mounted on the mounting plate 120, supports the set point adjusting screw 161 to which the set point knob 81 is attached, a pointer block 162 being positioned on the adjustment screw 161 and connected to the upper end of the set point member 80, the bottom end of which is connected to the coil spring 82 by means of the plate 164. The set point position of the pointer 165 is indicated on a scale 166 which is mounted on the bracket 160 and is calibrated in terms of current necesary to open or close the main control valve. The needle valve 78 is mounted on the mounting plate 120 by means of the nut 78b and a bracket 170, which is mounted on the mounting plate 120, is provided with the reset rate scale 171 which cooperates with the upper edge of the needle valve control plate 79 to provide an indication of the setting of the needle valve 78. The outlet 78a of the needle valve 78 returns to the reservoir within the housing 90. It will thus be noted that with the arrangement of the present invention, all feedback linkages are completely enclosed while providing proportional, reset and set point functions within the self-contained electro-hydraulic valve actuator unit.

Referring now to FIGS. 6 to 12, inclusive, there is shown therein the details of the electro-magnetic force balance unit and the associated control valve which are mounted from the brackets 127. This unit comprises the side wall members 200 and 201 which are bolted to a top plate 202 and a bottom plate 203, a cylindrical permanent magnet 204 being secured to the top plate 202. The permanent magnet 204 is provided with a pole piece 205 of reduced diameter which extends into an opening in the bottom plate 203 to provide the air gap 20 within which the nylon coil form 22 is positioned. The coil form 22 is supported on the right hand end of the beam 15 and is provided with the terminals 208 and 209 which are connected to the coil 21 and are adapted to be connected to the terminals 25 and 26 on the terminal board 210 which is mounted on the side wall 200.

In order to prevent oil flow through the air gap 20, there is provided a non-magnetic ring 207a, preferably of aluminum, which is positioned between the pole piece 204 and the bottom plate 203. The ring 207a has a very little shunting effect on the air gap 20 but effectively prevents metallic chips and other particles which may be carried by the oil from collecting in the air gap 20. In addition, the beam 15 is substantially completely enclosed by means of an upper closure member 203a, which is secured to the bottom edges of the side walls 200 and 201, and a bottom cover member, indicated in dotted lines in FIG. 6 at 204a. The member 203a is provided with a clearance opening 39a for the flexure member 39 and the oil surrounding the beam 15 and the air gap 20 must flow through the small opening 39a so that clogging of the air gap and consequent friction on the coil form 22 are effectively prevented. In this connection, it will be understood that a substantial damping effect is produced when the cup-shaped coil form 22 and the ring 207a are employed. If this damping effect is too great, relief holes may be provided in the bottom of the coil form 22.

In order to mount the beam 15, there is provided a bar 212 which extends between the bottom edges of the side walls 200 and 201, and supports the beam 15 through the crossed flexure members 213 and 214, these members being secured to a transverse bar 215 which is secured to the left hand end of the beam 15 by means of the bolts 216. The flexure member 39 is adjustably connected to the bar 215 by means of the screws 220 and the upper end of the flexure member 39 is connected to a bracket 221 (FIG. 9) which is connected to the bottom end of the movable valve element 35. It will be noted that the feedback linkage connections are made through the member 75 to the upper side of the movable valve element 35 and the connection from the beam 15 is made through the flexure member 39 to the bottom of the movable element 35. With this arrangement, the beam and air gap structure may be substantially completely enclosed while providing the above described feedback linkages to the movable valve element 35.

In order to mount the movable element 35 for limited movement in both directions from a neutral position, there is provided a U-shaped yoke member 225 which is secured to a manifold block 226 mounted on the side members 200 and 201 by means of the bolts 227, the yoke 225 being accurately positioned with respect to the manifold block 226 by means of the pins 228 and secured thereto by means of the through bolts 229. A pair of flexure members 230 and 231 are secured to the central portion of the yoke 225 and to the ends of the movable valve element 35 by means of the bolts 232 and 233, respectively. A pair of stop members 234 and 235 are also bolted to the opposed legs of the yoke 225 and are provided with arm portions 236 which limit the travel of the movable valve element 235 in each direction from a neutral position.

The manifold block 226 is provided with a central inlet port 32 which communicates with the conduit 32a from the check valve 50. The manifold 226 also includes an upper outlet port 33 and a lower outlet port 34 which communicate with the outlet conduits 33a and 33b which are connected to the top and bottom of the cylinder 59. The movable valve element 35 is provided with the cylindrical plug members 40 and 41 which are adapted to register with the outlet ports 33 and 34 when the valve element 35 is in its neutral position. A slot 240 is provided in the movable valve element 35 so that hydraulic fluid entering through the inlet port 32 may be supplied to either the outlet port 33 if the movable valve element 35 is moved upwardly as viewed in FIG. 12 or to the lower outlet port 34 if the movable valve element 35 is moved downwardly from the position shown in FIG. 12.

Considering now the manner in which the control valve is machined and assembled, the movable valve element 35 is first clamped to the manifold 226 and the openings 240 and 241 are drilled through the movable valve element 35 and into the manifold 226 so as to form the ports 33 and 34. After these openings have been drilled and reamed in the members 35 and 226, the plugs 40 and 41 are inserted into the movable element 35. The U-shaped member 225 is then clamped to the manifold 226 by means of appropriate jig fixtures and the openings for the pin 228 and the bolts 229 are drilled through the member 225 and into the member 226. The movable element 35 is then assembled on the U-shaped yoke 225 with the flexure members 230 relatively loose. The movable element and yoke assembly is then secured to the manifold 226 and the movable element is clamped in the neutral position, wherein the plugs 40 and 41 are concentric with the ports 33 and 34, by means of a bolt (not shown) which extends through the center portion of the yoke 225 and clamps the movable element 35 against the manifold 226. When the movable element has been properly aligned, the flexure members 230 are then securely clamped and the central clamping bolt is removed so that the movable element 35 is flexibly supported in the desired neutral position.

The pressure of the oil which is supplied through the inlet conduit 32 to the bottom surface of the movable valve element 35 exerts an upward force on the flexure elements 230 and 231 which acts as a negative spring rate and tends to compensate for the positive spring rate of the flexure elements 230, 231, themselves. Preferably, the pump develops a pressure of from 250 to 500 p.s.i. and produces a flow of approximately one-fourth gallon per minute with the movable valve element fully open. The dimensions of the slot 240 and the plugs 40, 41 are so chosen that a relatively small area of the movable element 35 is subjected to the inlet oil pressure so that a relatively small negative spring rate force is produced and the simple flexure elements 230, 231 may be employed. Preferably, the slot 240 has a width of one-eighth inch and the plugs 40 and 41 have a diameter of five-thirty seconds of an inch, the flexure elements 230 and 231 having a thickness of .01 inch, a width of one-half inch and an unsupported length of three-fourths inch. With these dimensions it has been found that the negative spring rate produced by the force of the oil in the movable element 35 is relatively small and is substantially constant from unit to unit. The coil 21 moves through a substantially uniform magnetic field established by the magnetic core structure and the beam 15 produces a force which varies uniformly with displacement over a relatively wide range of motion. As a result, a low pressure valve actuator unit is provided which is suitable for process control applications while providing an electromechanical balance unit which is less critical than torque devices having a very small range of motion while, at the same time, providing an actuator unit which develops a large power output. By providing the above described reservoir arrangement, no oil is wasted since any leakage from the cylinder 59 or the other sealed elements of the system is returned to the reservoir. Furthermore, relatively poor seals can be employed for the cylinder 59 since the leakage occurs only to the reservoir. In addition, the relatively low pressure employed in the system tends to minimize such leakage.

It will also be noted that the electromechanical balance unit and control valve assembly is immersed in the oil bath with the result that these elements are heated by the surrounding oil to approximately 50 to 60 degrees above ambient temperature, the oil being heated due to the pumping operation. Such an arrangement tends to stabilize the operating temperature of the actuator unit and also prevents changes in viscosity with changes in ambient temperature.

In the control of the process via the piston 61 from a remote position an electrical signal, usually of direct current, is transmitted via a line to the coil 21 disposed in the air gap of a magnet structure 19 which may include a permanent magnetic field. While motion of coil 21 may thus depend on direction of current in the coil, it will be assumed that a current of one signal is applied which is increased or decreased in accordance with desired control. Thus, if coil 21 moves upwardly upon increase in signal and downwardly upon a decrease in signal, it produces actuation of the arm 15 and of the high pressure control slider 35 via linkage 39, such that for a particular steady signal slide member 35 will be so disposed that plug members 40 and 41 close ports 33 and 34. This position of member 35 may correspond to any desired positioning of the piston 61 within the cylinder 59, in accordance with the rate of flow through valve 60 which may be desired. The strength of signal in coil 21 required for closing both ports 33 and 34 is under control of the spring 82, which acts in opposition to the force exerted on the coil by the electromagnet, the spring 82 being considered to produce a force in static equilibrium with the force exerted by beam 15. The position of equilibrium is under control of threaded shaft 80 and adjustment knob 81 thereon to initially set the electrical signal necessary to maintain slider 35 in a position to close both ports 33 and 34. This setting determines the position for which the piston 61 will be stabilized as static forces via links 37 and 74 equalize.

The position of piston 61 controls the valve 60 which in turn controls the amount of signal delivered to the coil 21 via means not shown. Normally, electrical controls will be available for changing the signal rate in the coil which may be adjusted along with the adjustment of the tension on spring 82. Spring 73 is a resilient means of feeding back to member 35 a force of transient duration to prevent sudden changes of position of piston 61, by resiliently delaying such operation. Element 71 with its associated valve 78 controls the rate at which a change is made via a type of feedback action essentially negative in character.

Piston 70 in cylinder 70a exerts a force on piston 72 by virtue of the fluid filling the cavity 77. This cavity communicates with a liquid supply at needle valve 78, and the hydraulic fluid flows to and from cavity 77 in accordance with the adjustment of needle valve 78 by the knob 79 thereby to permit change in spacing between pistons 72 and 70.

A change in control signal in coil 21 corresponding to the requirement to raise control arm 62 moves coil 21 upward and slider 35 downward to admit high pressure fluid via ports 34 and 58. As shaft 65 begins to rise, the cam surface 67 in contact with roller 68 is moved laterally. This actuates lever 69 rotating it about the fulcrum so as to raise piston 70 in accordance with the direction of motion of piston 61. When piston 70 is raised, piston 72 is also raised because fluid cannot immediately flow into cavity 77. Spring 73 is thus put in tension supplying a force tending to raise slider 35 in opposition to the force exerted via link 39. An opposite change in signal in coil 21 produces opposite action on slider 35 and spring 73. Thus, it is apparent that spring 73 will exert a force in opposition to the movement of coil 21, and the piston 61 is not fully moved to the control position until the tension (or compression) or spring 73 has been dissipated by entry or escape of fluid via valve 78.

When the direction of control via spring 73 is as described in connection with FIG. 1, as corrected, the response of the output member 62 may be said to be damped or softened. While some process controls might make desirable an adjustment to speed up the action of member 62 through a reversal of the direction of the cam action by rotation about pin 132, thereby to produce a feedback generally described as positive, adjustment to employ the negative feedback is suited to better stabilization by avoiding any tendency to instability such as might require further damping controls.

While there has been described what is at present considered to be the preferred embodiment of the invention, it will be understood that various modifications may be made therein which are within the true spirit and scope of the invention as defined in the appended claims.

I claim:

1. An electro-hydraulic actuator system comprising a housing, a pivotally supported beam in said housing, means within said housing defining a magnetic field, a coil carried by said beam and positioned in said magnetic field, means for supplying a direct current input signal to said coil so as to exert a force on said beam corresponding to said input signal, a control valve positioned within said housing and having a movable element connected to said beam for controlling fluid flow from a valve inlet to a valve outlet, a source of fluid for supplying fluid to said valve inlet at relatively high pressure, a cylinder positioned within said housing, a piston slidably mounted in said cylinder and connected to an output member, means connecting said valve outlet and said cylinder, a proportional band adjusting plate connected to the upper end of said piston and having a cam surface adjustably positionable with respect to the line of motion of said piston, connecting link means including a cam follower which is biased into engagement with said cam surface, dashpot means connecting said link means and said movable element of said control valve, thereby to apply a force to said beam in opposition to said input signal, said feedback force being variable by adjustment of the position of said proportional band plate with respect to said piston and said dashpot means controlling the rate at which the output member is reset in response to an abrupt change in said input signal.

2. An electro-hydraulic actuator system comprising a housing, a pivotally supported beam in said housing, means within said housing defining a magnetic field having an annular air gap, a coil carried by said beam and positioned in said air gap, means for supplying a direct current input signal to said coil so as to exert a force on said beam corresponding to said input signal, a control valve positioned within said housing and having a movable element connected to said beam for controlling fluid flow from a valve inlet to a valve outlet, a source of fluid for supplying fluid to said valve inlet at relatively high pressure, fluid pressure responsive means positioned within said housing and connected to said valve outlet for moving an output member in accordance with the position of said control valve, feedback means within said housing interconnecting said pressure responsive means and said movable element of said control valve for applying a force to said beam in opposition to said input signal, and means substantially completely enclosing said beam within said fluid to prevent fluid flow in the region of said air gap and the deposit of magnetic particles from said fluid in said air gap.

3. An electro-hydraulic actuator system comprising a pivotally supported beam, means defining a magnetic field, a coil carried by said beam and positioned in said magnetic field, means for supplying a direct current input signal to said coil so as to exert a force on said beam corresponding to said input signal, a control valve having a stationary manifold provided with a pair of outlet ports and a movable element provided with a pair of plug members interconnected by means of a slot in said movable element, means including a pair of thin resilient flexure mounting elements for supporting said movable element in a neutral position while permitting movement of said movable element in the direction of said slot, said plug members being adapted to register with said outlet ports when said movable element is in said neutral position, means for supplying fluid through said manifold to said slot at sufficient pressure to at least partially overcome the spring rate of said flexure mounting elements, means connecting said movable valve element to said beam for movement therewith, fluid pressure responsive means connected to said outlet ports for moving an output member in accordance with the position of said movable valve element, and feedback means interconnecting said pressure responsive means and said movable valve element for applying a force to said beam in opposition to said input signal.

4. An electro-hydraulic actuator system comprising a pivotally supported beam, means defining a magnetic field, a coil carried by said beam and positioned in said magnetic field, means for supplying a direct current input signal to said coil so as to exert a force on said beam corresponding to said input signal, a control valve having a stationary manifold provided with a pair of outlet ports and a movable element provided with a pair of plug members interconnected by means of a slot in said movable element, means including a pair of thin resilient flexure mounting elements for supporting said movable element in a neutral position while permitting movement of said movable element in the direction of said slot, said plug members being adapted to register with said outlet ports when said movable element is in said neutral position, means for supplying fluid through said manifold to said slot at sufficient pressure to at least partially overcome the spring rate of said flexure mounting elements, means connecting said movable valve element to said beam for movement therewith, fluid pressure responsive means connected to said outlet ports for moving an output member in accordance with the position of said movable valve element, and feedback means interconnecting said pressure responsive means and said movable valve element for applying a force to said beam in opposition to said input signal, said feedback means including proportional band adjusting means for varying the amount of feedback force applied to said beam per unit change in said input signal.

5. An electro-hydraulic actuator system comprising a pivotally supported beam, means defining a magnetic field, a coil carried by said beam and positioned in said magnetic field, means for supplying a direct current input signal to said coil so as to exert a force on said beam corresponding to said input signal, a control valve having a stationary manifold provided with a pair of outlet ports and a movable element provided with a pair of plug members interconnected by means of a slot in said movable element, means including a pair of thin resilient flexure mounting elements for supporting said movable element in a neutral position while permitting movement of said movable element in the direction of said slot, said plug members being adapted to register with said outlet ports when said movable element is in said neutral position, means for supplying fluid through said manifold to said slot at sufficient pressure to at least partially overcome the spring rate of said flexure mounting elements, means connecting said movable valve element to said beam for movement therewith, fluid pressure responsive means connected to said outlet ports for moving an output member in accordance with the position of said movable valve element, feedback means interconnecting said pressure responsive means and said movable valve element for applying a force to said beam in opposition to said input signal and dashpot means included in said feedback means for controlling the rate at which the output member is reset in response to an abrupt change in said input signal.

6. An electro-hydraulic actuator system comprising a pivotally supported beam, means defining a magnetic field, a coil carried by said beam and positioned in said magnetic field, means for supplying a direct current input signal to said coil so as to exert a force on said beam corresponding to said input signal, a control valve having a movable element connected to said beam for controlling fluid flow from a valve inlet to a valve outlet, means for supplying fluid at relatively high pressure to said valve inlet, fluid pressure responsive means connected to said valve outlet for moving an output member in accordance with the position of said movable valve element, a cylinder having first and second pistons independently movable therein, means including a first linkage for connecting said first piston to said pressure responsive means for movement therewith, means including a second linkage for connecting said second piston to said movable valve element, thereby to apply a feedback force to said beam in opposition to said input signal, and means including a needle valve connected to said cylinder intermediate said first and second pistons for adjusting the rate at which the output member is reset in response to an abrupt change in said input signal.

7. In an electro-hydraulic actuator of the type having a housing, a pivotally supported beam in said housing, means within said housing defining a magnetic field, a coil carried by said beam and positioned in said magnetic field, means for supplying an input signal to said coil so as to exert a force on said beam corresponding to said input signal, a control valve positioned within said housing and having a movable element connected to said beam for controlling fluid flow from a valve inlet to a valve outlet, a source of fluid for supplying fluid to said valve inlet at relatively high pressure, fluid pressure responsive means connected to said valve outlet for moving an output member in accordance with the position of said control valve, an improved feedback device for applying a force to said beam in opposition to said input signal and comprising a proportional band adjusting plate connected to said pressure responsive means and having a cam surface adjustably positionable with respect to the line of motion of said output member, connecting link means including a cam follower which is biased into engagement with said cam surface, dashpot means connecting said link means and said movable element of said control valve, said force on said beam being variable by adjustment of the position of said proportional band plate with respect to said output member and said dashpot controlling the rate at which the output member is reset in response to an abrupt change in said input signal.

8. An improved feedback device as set forth in claim 7 above and additionally including a needle valve connected to said dashpot for varying the reset rate of said output member.

9. An improved feedback device as set forth in claim 8 above and additionally including means to vary the set point of the control valve thereby varying the input signal necessary to actuate the control valve.

10. An improved feedback device as set forth in claim 7 above and additionally including means to vary the set point of the control valve thereby varying the input signal necessary to actuate the control valve.

11. In an electro-hydraulic actuator of the type having a housing, a pivotally supported beam in said housing, means within said housing defining a magnetic field, a coil carried by said beam and positioned in said magnetic field, means for supplying an input signal to said coil so as to exert a force on said beam corresponding to said input signal, a control valve positioned within said housing and having a movable element connected to said beam for controlling fluid flow from a valve inlet to a valve outlet, a source of fluid for supplying fluid to said valve inlet at relatively high pressure, fluid pressure responsive means connected to said valve outlet for moving an output member in accordance with the position of said control valve, comprising feedback means for applying a force to said beam in opposition to said input signal, means for varying the amount of feedback force applied to said beam per unit change in said input signal, means for controlling the reset rate at which the output member is reset in response to abrupt changes in the input signal, means for varying the reset rate, and means for varying the input signal necessary to actuate the control valve.

References Cited in the file of this patent

UNITED STATES PATENTS

| | | |
|---|---|---|
| 1,106,434 | Woodward | Aug. 11, 1914 |
| 1,564,688 | Kimball | Dec. 8, 1925 |
| 2,020,847 | Mitereff | Nov. 12, 1935 |
| 2,438,957 | Wunsch et al. | Apr. 6, 1948 |
| 2,681,044 | Eggenberger | June 15, 1954 |
| 2,688,253 | Markson | Sept. 7, 1954 |
| 2,789,543 | Popowsky | Apr. 23, 1957 |
| 2,977,051 | Farkas et al. | Mar. 28, 1961 |